(12) United States Patent
Kamakura et al.

(10) Patent No.: US 11,862,018 B2
(45) Date of Patent: Jan. 2, 2024

(54) DRIVING ASSISTANCE APPARATUS

(71) Applicant: Honda Motor Co., Ltd., Tokyo (JP)

(72) Inventors: Hiroshi Kamakura, Wako (JP); Hiroki Nakajima, Wako (JP); Masataka Izawa, Wako (JP); Kazuki Yamoto, Wako (JP); Yasuhiko Awamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/977,187

(22) Filed: Oct. 31, 2022

(65) Prior Publication Data

US 2023/0140557 A1 May 4, 2023

(30) Foreign Application Priority Data

Nov. 4, 2021 (JP) ................................. 2021-180329

(51) Int. Cl.
  *G08G 1/0967* (2006.01)
  *G08G 1/052* (2006.01)
(52) U.S. Cl.
  CPC ........... *G08G 1/0967* (2013.01); *G08G 1/052* (2013.01)
(58) Field of Classification Search
  CPC ................ G08G 1/0967; G08G 1/052; G08G 1/096783; G08G 1/096741
  See application file for complete search history.

(56) References Cited

U.S. PATENT DOCUMENTS

| 8,773,281 | B2 * | 7/2014 | Ghazarian | G08G 1/164 340/903 |
| 9,437,110 | B2 * | 9/2016 | Otake | G08G 1/096741 |
| 11,043,123 | B2 * | 6/2021 | Hori | B60W 30/16 |
| 11,084,489 | B2 * | 8/2021 | Ogino | B60W 30/143 |
| 11,167,767 | B2 * | 11/2021 | Ishii | G08G 1/09623 |
| 11,648,937 | B2 * | 5/2023 | Ikezawa | B60W 40/04 701/93 |
| 2003/0016143 | A1 * | 1/2003 | Ghazarian | G08G 1/0962 340/901 |
| 2012/0029730 | A1 * | 2/2012 | Nagura | G08G 1/096725 701/2 |

(Continued)

FOREIGN PATENT DOCUMENTS

JP  2014096016 A  5/2014

*Primary Examiner* — Hoi C Lau
(74) *Attorney, Agent, or Firm* — Duft & Bornsen, PC (57) ABSTRACT

A driving assistance apparatus including a display part, a distance measurement part measuring inter-vehicle distance from a subject vehicle to a preceding vehicle and a microprocessor. The microprocessor is configured to perform acquiring traffic light information including switching information on a traffic light and position information on the subject vehicle with respect to the traffic light, deriving a recommended driving for the driver based on the traffic light information and the position information, and controlling the display part so as to notify the driver of information on the recommended driving, the controlling including controls the display part so as to display a first image corresponding to the recommended driving when the inter-vehicle distance is larger than a predetermined value and to display a second image as warning information together with the first image when the inter-vehicle distance is equal to or smaller than the predetermined value.

13 Claims, 6 Drawing Sheets

(56) References Cited

U.S. PATENT DOCUMENTS

| | | | |
|---|---|---|---|
| 2012/0095646 A1* | 4/2012 | Ghazarian | G01S 19/17 340/905 |
| 2014/0285331 A1* | 9/2014 | Otake | G08G 1/096716 340/435 |
| 2018/0154870 A1* | 6/2018 | Kurata | B60T 7/22 |
| 2019/0180617 A1* | 6/2019 | Hori | B60W 50/0097 |
| 2019/0344801 A1* | 11/2019 | Ishii | B60W 30/18 |
| 2019/0389465 A1* | 12/2019 | Ogino | B60W 30/18009 |
| 2021/0162992 A1* | 6/2021 | Ikezawa | B60W 50/14 |
| 2021/0370964 A1* | 12/2021 | Uenoyama | B60W 50/14 |
| 2022/0089173 A1* | 3/2022 | Fish | B60W 50/14 |
| 2022/0208008 A1* | 6/2022 | Matsuoka | G08G 1/07 |
| 2022/0319317 A1* | 10/2022 | Kamakura | H04L 67/12 |
| 2023/0069211 A1* | 3/2023 | Kamakura | G08G 1/096716 |
| 2023/0140557 A1* | 5/2023 | Kamakura | G08G 1/096716 340/435 |
| 2023/0154322 A1* | 5/2023 | Kamakura | D21D 1/38 701/119 |
| 2023/0191993 A1* | 6/2023 | Fish | G06T 7/55 340/435 |

* cited by examiner

DRIVING ASSISTANCE APPARATUS

CROSS-REFERENCE TO RELATED APPLICATION

This application is based upon and claims the benefit of priority from Japanese Patent Application No. 2021-180329 filed on Nov. 4, 2021, the content of which is incorporated herein by reference.

BACKGROUND OF THE INVENTION

Field of the Invention

This invention relates to a driving assistance apparatus that assists a driving operation of a driver.

Description of the Related Art

Conventionally, as an apparatus of this type, there is a known apparatus that notifies a start timing of accelerator-off operation to a driver of the vehicle traveling on the road where the traffic light is installed. Such an apparatus is described, for example, in Japanese Unexamined Patent Publication No. 2014-096016 (JP2014-096016A). In the apparatus described in JP2014-096016A, a timing of a deceleration operation is notified to the driver via the display unit so that the vehicle can pass through the intersection where the traffic light is installed in a non-stop manner.

In a situation where there is a preceding vehicle traveling in front of the subject vehicle, by providing information in accordance with the situation to the driver, it is possible to suppress a decrease in the traffic smoothing while improving traffic safety without hindering the traffic flow in the vicinity. However, the device described in JP2014-096016A does not propose any information presentation to the driver when the preceding vehicle is present.

SUMMARY OF THE INVENTION

An aspect of the present invention is a driving assistance apparatus including: a display part displaying information; a distance measurement part measuring an inter-vehicle distance from a subject vehicle to a preceding vehicle traveling ahead of the subject vehicle; and an electronic control unit including a microprocessor and a memory connected to the microprocessor. The microprocessor is configured to perform: acquiring traffic light information including switching information on a traffic light and position information on a position of the subject vehicle with respect to the traffic light, the traffic light informing a driver of stopping or non-stopping at a predetermined position; deriving a recommended driving for the driver, based on the traffic light information and the position information; and controlling the display part so as to notify the driver of information on the recommended driving. The microprocessor is configured to perform the controlling including controls the display part so as to display a first image corresponding to the information on the recommended driving when the inter-vehicle distance measured by the distance measurement part is larger than a predetermined value and to display a second image as warning information together with the first image when the inter-vehicle distance is equal to or smaller than the predetermined value.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1A:
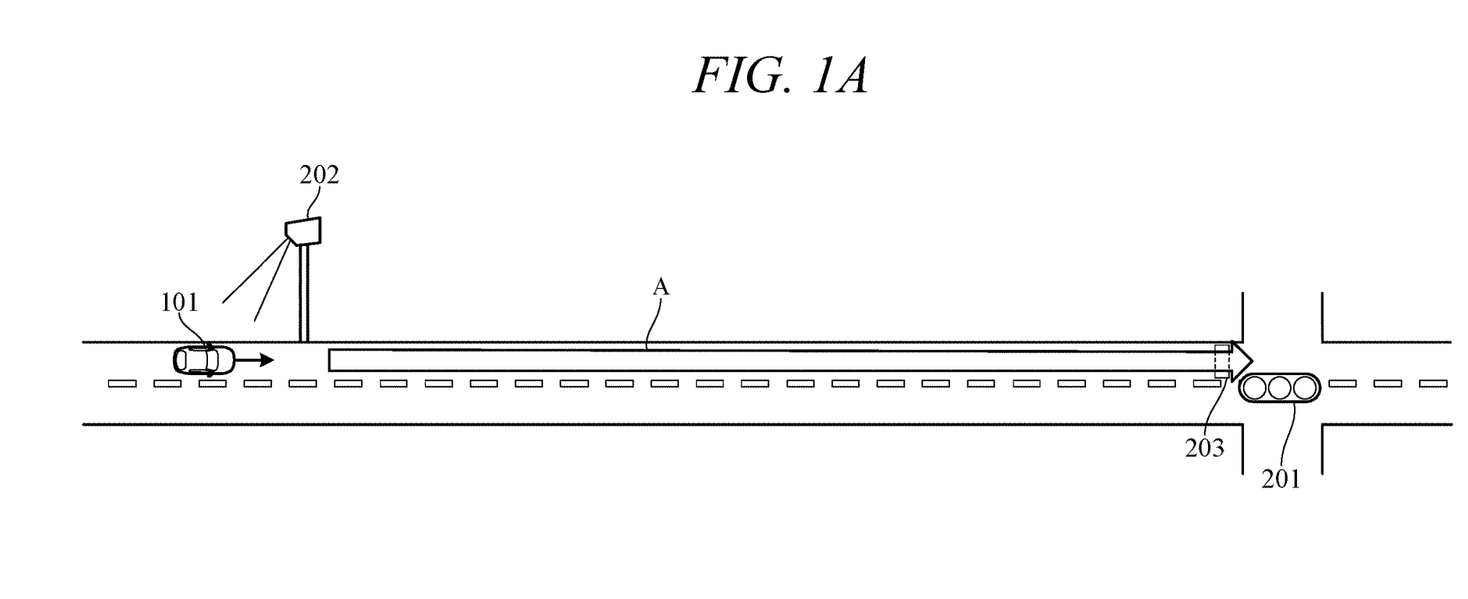
FIG. 1A is a diagram showing an example of a travel scene of a vehicle having a driving assistance apparatus according to an embodiment of the present invention.
Figure 1B:
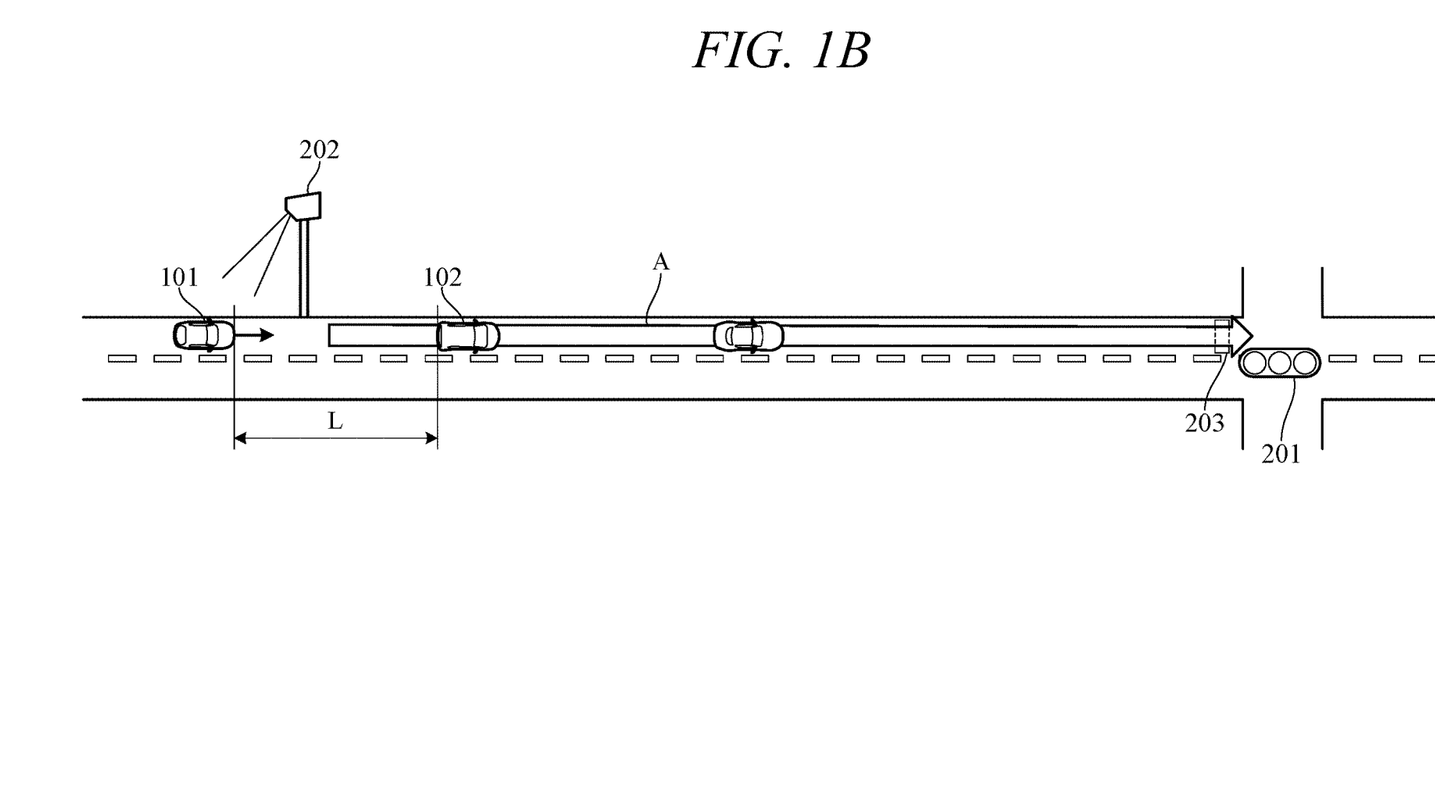
FIG. 1B is a diagram showing another example of the travel scene of the vehicle having the driving assistance apparatus according to the embodiment of the present invention.

Hereinafter, an embodiment of the present invention is explained with reference to FIGS. 1A to 5. FIGS. 1A and 1B are diagrams showing examples of travel scenes of a subject vehicle having a driving assistance apparatus according to an embodiment of the present invention. FIGS. 1A and 1B illustrates an example of the vehicle 101 traveling along an arrow "A" on a road on which a traffic light 201 is installed. In particular, in FIG. 1A, an example in which a preceding vehicle traveling ahead of the subject vehicle 101 does not exist in a section from the subject vehicle 101 to the traffic light 201 is illustrated, and in FIG. 1B, an example in which the preceding vehicle 102 exists in the section is illustrated.

The traffic light 201 is configured to sequentially switch between a red light indicating a stop instruction, a green light (a blue light) indicating that traveling is possible, and a yellow light indicating that traveling is possible but safe stop is difficult at a predetermined cycle. The traffic light may be an arrow traffic light which indicates a travelable direction by an arrow, rather than the light color is switched. The traffic light may be sequentially switched between green light and red light.

The vehicle 101 receives traffic light information on the traffic light 201 from a communication device (e.g., an optical beacon roadside unit 202) such as an optical beacon, a radio beacon installed on the side of the road. The traffic light information includes switching information of the traffic light 201, for example, switching information such as remaining time until the traffic light 201 switches from green to yellow and from red to green. FIG. 1A and FIG. 1B illustrate the example in which the subject vehicle 101 passes through the intersection where the traffic light 201 is installed without stopping, that is, the example in which the subject vehicle 101 travels without stopping at a stop line 203.

In the situation where the subject vehicle 101 travels toward the intersection where the traffic light 201 is installed in this way, the driving assistance apparatus according to the embodiment of the present invention is configured to provide predetermined information to the driver of the subject vehicle 101 based on the traffic light information received from the optical beacon roadside unit 202. That is, the driving assistance apparatus has a driving assistance function for notifying the driver of information (information of a target vehicle speed range) of a vehicle speed range in which the subject vehicle 101 can pass without stopping at the intersection, information of a deceleration instruction when the subject vehicle 101 stops at an intersection, and the like.

The information on the vehicle speed range and the information on the deceleration instruction are displayed on a display device provided on an instrument panel facing the driver. A display of a navigation unit disposed at the vicinity of the instrument panel can also be used as the display device. The display device may be configured by a head-up display for projecting an image on a panel provided at a windshield or near the windshield.

Figure 2A:
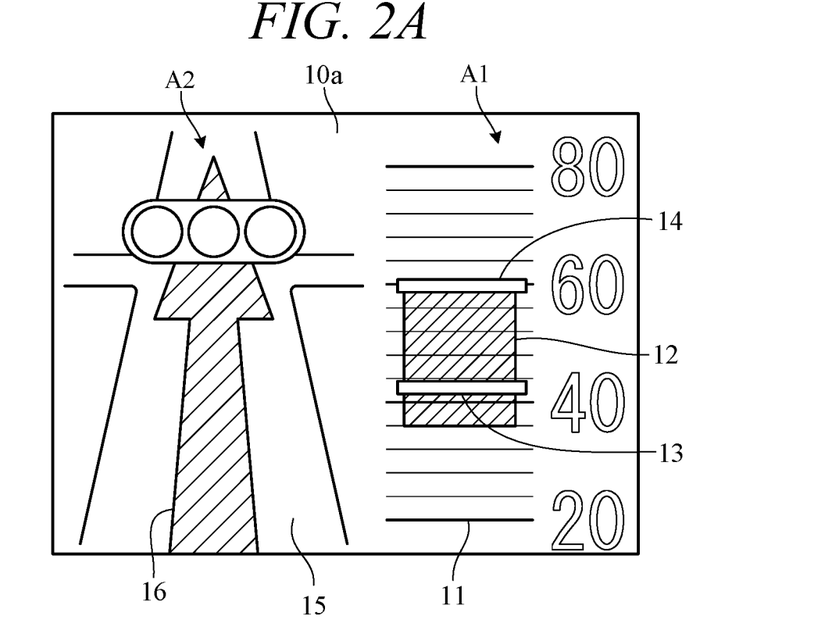
FIG. 2A is a diagram showing an example of a display screen by the driving assistance apparatus according to the embodiment of the present invention.

FIG. 2A is a diagram showing an example of a display screen 10a displayed on the display device (monitor) when the subject vehicle is approaching the traffic light. As shown in FIG. 2A, on the display screen 10a, an image indicating the target vehicle speed range is displayed in the area A1 of one of the left and right sides (e.g., the right side), and an image indicating whether or not the subject vehicle can pass through the intersection where the traffic light is installed without stopping is displayed in the area A2 of another of the left and right sides (e.g., the left side). FIG. 2A corresponds to the display screen 10a of the vehicle 101 traveling toward the traffic light 201 as shown in FIG. 1A, for example.

The image of the area A1 includes a scale image 11 indicating the vehicle speed on a scale along with a numerical value, a target vehicle speed image 12 (hatching) indicating the target vehicle speed range in which the subject vehicle can pass through the intersection where the traffic light ahead of the vehicle is installed without stopping, a bar-shaped subject vehicle speed image 13 indicating the current vehicle speed of the subject vehicle, and a bar-shaped legal speed image 14 indicating the legal speed of the road. The target vehicle speed image 12, the subject vehicle speed image 13, and the legal speed image 14 are displayed on the scale image 11 in association with the scale image 11. The monitor has a color display. The scale image 11, the target vehicle speed image 12, the subject vehicle speed image 13, and the legal speed image 14 are displayed in different colors from each other. In FIG. 2A, the maximum value of the target vehicle speed range coincides with the legal speed. The display of the legal speed image 14 may be omitted.

In the area A2, a background image 15 schematically showing a road and a traffic light, and a driving behavior image 16 (hatching) indicating that the subject vehicle can travel without stopping at the intersection where the traffic light is installed, are displayed. The driving behavior image 16 is an image showing the driving behavior of the subject vehicle 101 passing through the intersection where the traffic light 201 is installed without the subject vehicle 101 stopping. If the subject vehicle speed is within the target vehicle speed range, the subject vehicle can travel without stopping at the intersection. In response to this situation, in the example of FIG. 2A, the driving behavior image 16 is represented by an image of an arrow exceeding the traffic light image on the road image of the background image 15.

Thus, on the display screen 10a, the subject vehicle speed image 13 indicating the current vehicle speed is displayed in association with the target vehicle speed image 12 indicating the target vehicle speed range, and further, the driving behavior image 16 of the subject vehicle is displayed. Therefore, the driver can easily grasp necessity of acceleration and deceleration of the subject vehicle for smoothly passing through the intersection where the traffic light is installed, and good driving assistance for the driver is possible.

Figure 2B:
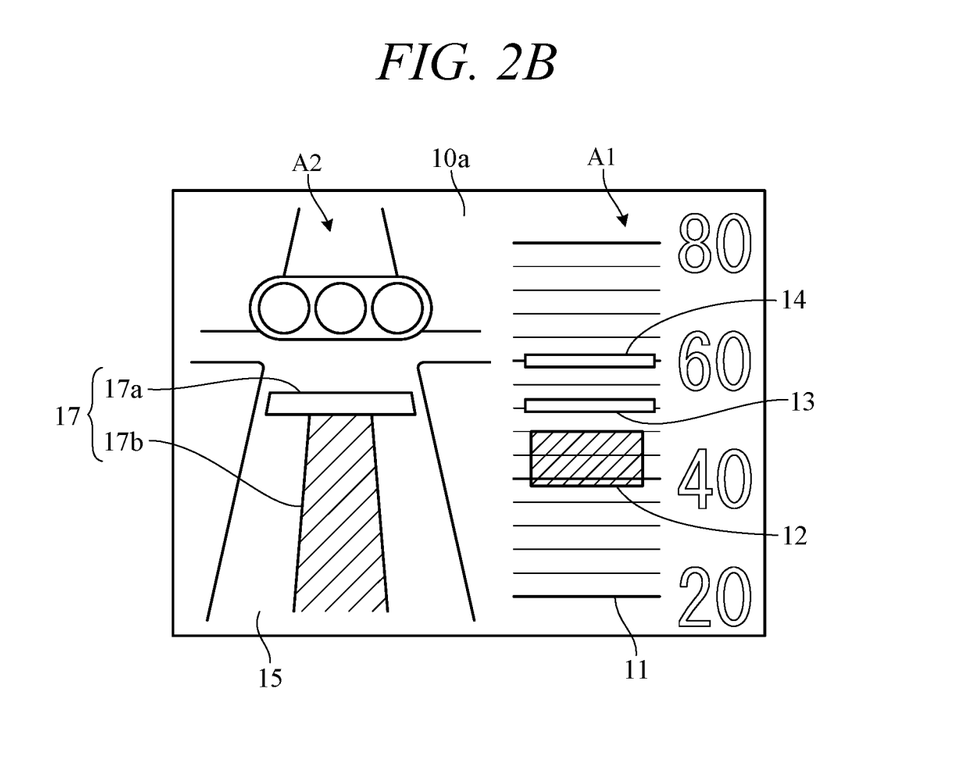
FIG. 2B is a diagram showing another example of the display screen by the driving assistance apparatus according to the embodiment of the present invention.

If the traffic light switches from green to red before the subject vehicle reaches the traffic light, or if the traffic light is still red when the subject vehicle reaches the traffic light, the subject vehicle needs to stop in front of the traffic light. FIG. 2B is a diagram illustrating an example of the display screen 10a in such a case. FIG. 2B corresponds to the display screen 10a when the subject vehicle stops at the stop line 203 in front of the traffic light 201 in FIG. 1, for example.

As shown in FIG. 2B, the target vehicle speed image 12, the subject vehicle speed image 13, and the legal speed image 14 are displayed in the area A1. The target vehicle speed image 12 is an image showing the target vehicle speed range for the traveling vehicle to stop smoothly on the stop line while suppressing the deceleration to a predetermined value or less. The target vehicle speed image 12 may be omitted. In the area A2, a deceleration instruction image 17 indicating the deceleration instruction of the vehicle is displayed on the background image 15. Specifically, the deceleration instruction image 17 including an image 17a of the stop line and a band-shaped image 17b as shown by hatching toward the image 17a is displayed. Thus, when the deceleration of the subject vehicle is required to stop the subject vehicle in front of the traffic light (when the subject vehicle speed is larger than the target vehicle speed), the deceleration instruction image 17 indicating an instruction of the deceleration operation is displayed on the display screen 10a. Accordingly, the driver can easily recognize necessity of the deceleration operation, and can decelerate the subject vehicle at a good timing.

By the way, when the subject vehicle travels by the driver's operation according to display of the display screen 10a in a state where the preceding vehicle 102 exists as illustrated in FIG. 1B, the subject vehicle 101 may approach (e.g. rapidly approach) the preceding vehicle 102. Specifically, in a case where the maximum value of the target vehicle speed defined by the target vehicle speed image 12 is faster than the vehicle speed of the preceding vehicle 102 and the driver referring to information regarding the target vehicle speed range drives to travel at the maximum value of the target vehicle speed in order to pass through the intersection without stopping, the subject vehicle 101 approaches the preceding vehicle 102. In order to enhance safety in such a case, the present embodiment provides a driving assistance apparatus as follows.

Figure 3:
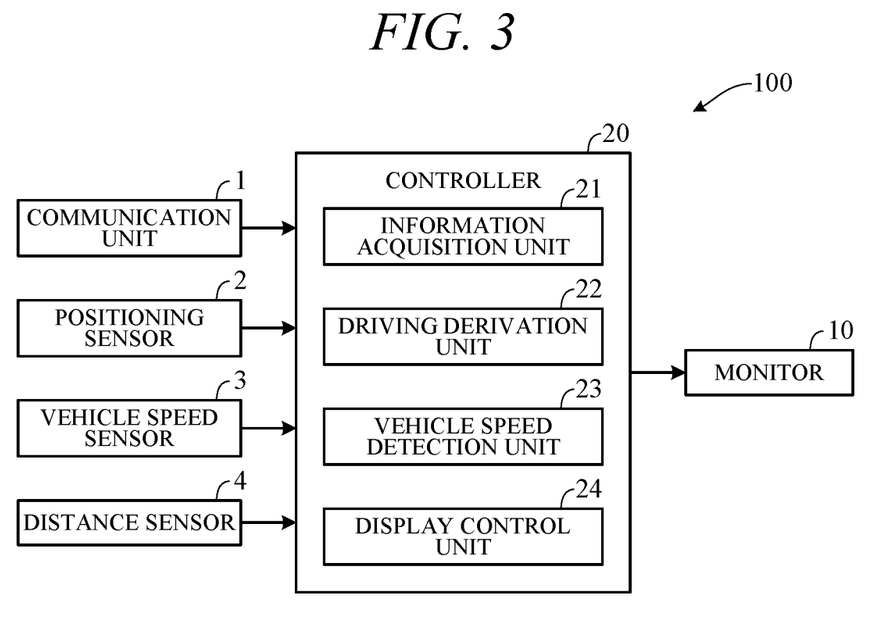
FIG. 3 is a block-diagram illustrating a configuration of a main part of the driving assistance apparatus according to the embodiment of the present invention.

FIG. 3 is a block-diagram schematically illustrating a configuration of a main part of the driving assistance apparatus 100 according to the embodiment of the present invention. As shown in FIG. 3, the driving assistance apparatus 100 includes a controller 20, and a communication unit 1, a positioning sensor 2, a vehicle speed sensor 3, distance sensor 4 and a monitor 10 which are communicably connected to the controller 20, respectively.

The communication unit 1 is configured to be capable of wirelessly communicating with the optical beacon roadside unit 202 (FIGS. 1A and 1B) provided on the road, that is, capable of road-to-vehicle communication. The communication unit 1 receives, from the communication device provided in the optical beacon roadside unit 202, the traffic light information on the traffic light located in the traveling direction of the subject vehicle, i.e., the traffic light information on the traffic light installed at the intersection where the subject vehicle passes next. The traffic light information includes position information of the traffic light and information on the switching time of the light color of the traffic light. The information on the switching time includes information on the remaining time until the traffic light is switched from green to yellow when the traffic light is currently green, and information on the remaining time until the traffic light is switched to green next when the traffic light is not currently green (for example, red).

The positioning sensor 2 receives signal for positioning transmitted from the positioning satellite. Positioning satellites are artificial satellites such as GPS satellites and quasi-zenith satellites. Using positioning information received by the positioning sensor 2, the current position of the subject vehicle (latitude, longitude, altitude) is measured. The positioning sensor 2 is used to detect the position (distance to the signal, etc.) of the subject vehicle relative to the position of the intersection where the traffic light is installed. Therefore, it is also possible to use a distance detector (radar, LIDAR, etc.) for detecting the distance from the subject vehicle to the object (object in the vicinity of the intersection) in place of the positioning sensor 2. The vehicle speed sensor 3 detects the vehicle speed of the vehicle.

The distance sensor 4 detects an inter-vehicle distance L between the subject vehicle 101 and the preceding vehicle 102 as illustrated in FIG. 1B. The distance sensor 4 can be, for example, a LIDAR that measures a distance and direction from an object (preceding vehicle) by emitting a pulsed infrared laser beam and detecting a reflected beam reflected by the object or a radar that detects a distance and direction from the object by emitting an electromagnetic wave and detecting a reflected wave. The LIDAR and the radar can also detect a speed of the object.

A controller 20 executes predetermined processing on the basis of signals from a communication unit 1, a positioning sensor 2, a vehicle speed sensor 3, and the distance sensor 4 and outputs a control signal to a monitor 10 including the display screen 10a. The controller 20 includes an electronic control unit having a microprocessor and a memory connecting the microprocessor. More specifically, the controller 20 includes a computer including a CPU, a ROM, a RAM, and other peripheral circuits such as an I/O interface. The controller 20 includes, as functional components, an information acquisition unit 21, a driving derivation unit 22, a vehicle speed detection unit 23, and a display control unit 24. A memory of the controller 20 stores road information in advance. The road information includes information regarding a legal speed of each road.

The information acquisition unit 21 acquires traffic light information received by the communication unit 1, information (position information) regarding a current position of the subject vehicle detected by the positioning sensor 2, information (vehicle speed information) regarding the vehicle speed of the subject vehicle detected by the vehicle speed sensor 3, and information (inter-vehicle distance information) regarding the inter-vehicle distance from the preceding vehicle detected by the distance sensor 4. The inter-vehicle distance information also includes the speed of the preceding vehicle. Further, the information acquisition unit 21 specifies a road on which the subject vehicle is traveling according to the position information of the subject vehicle and acquires information (legal speed information) regarding the legal speed corresponding to the road on the basis of the road information stored in advance in the memory.

The driving derivation unit 22 derives recommended driving for the driver on the basis of the traffic light information, the position information, the vehicle speed information, and the legal speed information acquired by the information acquisition unit 21. Specifically, the driving derivation unit calculates a distance between the subject vehicle and the intersection where a traffic light is installed by using the position information and also calculates a vehicle speed range in which the subject vehicle can pass through the intersection without stopping on the basis of the above distance and a remaining time until the traffic light ahead of the subject vehicle changes from green to yellow included in the traffic light information. Then, the driving derivation unit calculates, as the target vehicle speed range, a vehicle speed range equal to or lower than the legal speed within the above vehicle speed range. The target vehicle speed range is included in the recommended driving for the driver.

Meanwhile, when determining that the subject vehicle cannot pass through the intersection without stopping at the vehicle speed lower than the legal speed, the driving derivation unit 22 calculates a target vehicle speed range for the subject vehicle to smoothly stop in front of the traffic light, i.e., in front of the stop line at the intersection. Then, in case where the vehicle speed of the subject vehicle included in the vehicle speed information exceeds the target vehicle speed, the driving derivation unit derives a deceleration instruction including the target vehicle speed range as the recommended driving. Alternatively, the driving derivation unit simply derives a deceleration instruction for stopping the subject vehicle in front of the traffic light, without calculating the target vehicle speed range.

The vehicle speed detection unit 23 detects the vehicle speed of the preceding vehicle on the basis of the vehicle speed of the subject vehicle detected by the vehicle speed sensor 3 and an amount of change in the inter-vehicle distance L detected by the distance sensor 4. That is, the amount of change in the inter-vehicle distance L per unit time corresponds to a relative vehicle speed of the preceding vehicle to the subject vehicle, and the vehicle speed of the preceding vehicle is detected (calculated) by adding the relative vehicle speed to the vehicle speed of the subject vehicle. The vehicle speed of the preceding vehicle may be detected by acquiring vehicle speed information from the preceding vehicle via the communication unit 1.

The display control unit 24 controls display of the monitor 10 so as to display the recommended driving derived by the driving derivation unit 22. For example, when the driving derivation unit 22 determines that the subject vehicle can pass through the intersection without stopping in a state where no preceding vehicle exists as illustrated in FIG. 1A, the display control unit controls the monitor 10 such that, as illustrated in FIG. 2A, the target vehicle speed image 12, the subject vehicle speed image 13, and the legal speed image 14 are displayed in association with the scale image 11 and, in addition, the driving behavior image 16 indicating that the subject vehicle can pass through the intersection without stopping is displayed on the background image 15.

Meanwhile, when the driving derivation unit 22 determines that the subject vehicle cannot pass through the intersection without stopping, the display control unit 24 controls the monitor 10 such that, as illustrated in FIG. 2B, the target vehicle speed image 12, the subject vehicle speed image 13, and the legal speed image 14 are displayed in association with the scale image 11 and, in addition, the deceleration instruction image 17 indicating the deceleration operation instruction is displayed on the background image 15. The images in FIGS. 2A and 2B will be referred to as reference images for convenience. The reference images are display images in a case where there is no possibility of approaching the preceding vehicle in the section to the traffic light 201 or there is no possibility of approaching the preceding vehicle by a predetermined degree or more. The reference images are images serving as passing assist display for the intersection.

In the state where the preceding vehicle exists as illustrated in FIG. 1B, the display control unit 24 controls the monitor 10 as follows. First, the display control unit 24 determines whether or not the vehicle speed of the preceding vehicle detected by the vehicle speed detection unit 23 is smaller than the maximum value of the target vehicle speed range derived by the driving derivation unit 22. When it is determined that the vehicle speed of the preceding vehicle is larger than or equal to the maximum value of the target vehicle speed range, the subject vehicle does not approach the preceding vehicle. In this case, the display control unit controls the monitor 10 such that the reference image is displayed as in FIG. 2A.

Meanwhile, when it is determined that the vehicle speed of the preceding vehicle is smaller than the maximum value of the target vehicle speed range, the subject vehicle may approach the preceding vehicle. In this case, the display control unit 24 further determines whether or not the inter-vehicle distance L is equal to or less than a predetermined value La on the basis of the inter-vehicle distance information acquired by the information acquisition unit 21. The predetermined value La is set according to the vehicle speed, and the predetermined value La increases as the vehicle speed increases. In a case where the inter-vehicle distance L is larger than the predetermined value La, the display control unit controls the monitor 10 such that the reference image is displayed. When the inter-vehicle distance L is equal to or smaller than the predetermined value La, the display control unit controls the monitor 10 such that a warning image indicating warning information is displayed together with the reference image in order to draw the driver's attention. For example, the display control unit controls the monitor 10 such that the warning image is displayed on the display screen 10a in addition to the reference image.

Figure 4A:
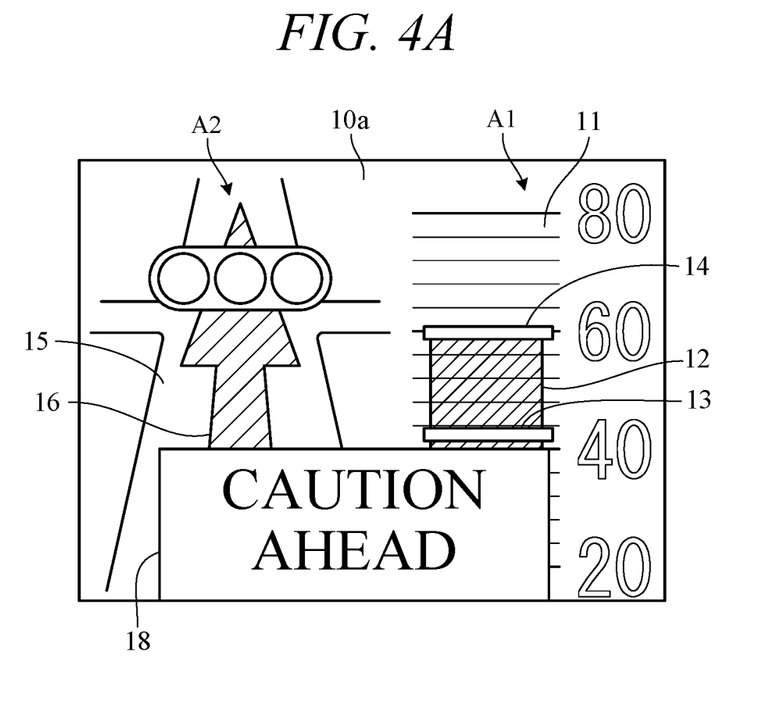
FIG. 4A is a diagram showing an example of the display screen when a preceding vehicle exists.

FIG. 4A illustrates an example thereof and is an example where the subject vehicle can pass through the intersection with a green light. As illustrated in FIG. 4A, a warning image 18 is displayed on the display screen 10a so as to be superimposed on the reference image. The warning image 18 includes a message that notifies the driver of approach to the preceding vehicle. For example, a message "Caution ahead" is highlighted in a display color different from that of the reference image (the target vehicle speed image 12, the background image 15, and the like). Therefore, the driver can easily recognize that there is a possibility of approaching the preceding vehicle if the subject vehicle travels at the target vehicle speed.

Figure 4B:
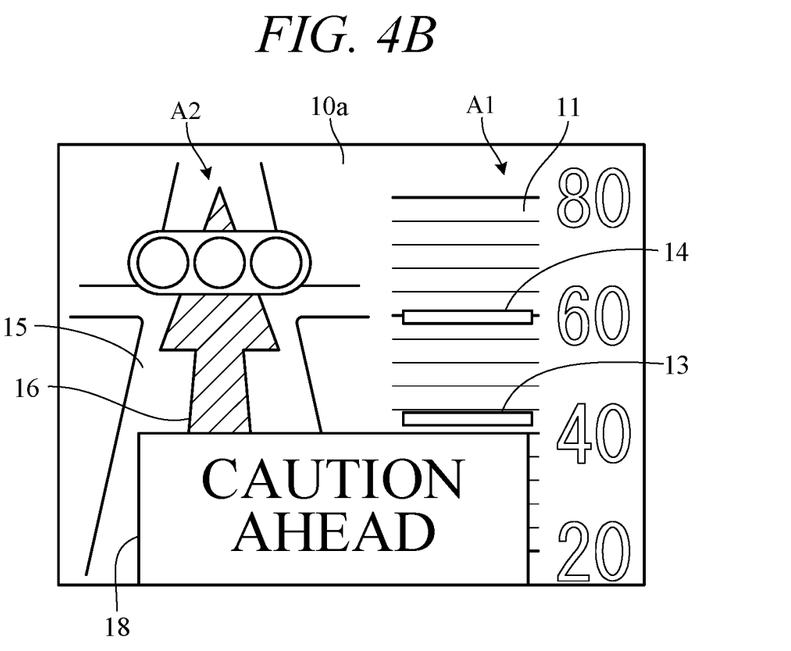
FIG. 4B is a diagram showing a modification of FIG. 4A.

FIG. 4B illustrates a modification example of FIG. 4A. In FIG. 4B, as compared with FIG. 4A, display of the target vehicle speed image 12 that is a part of the reference image is omitted. That is, a part of the image serving as the passing assist display for the intersection is hidden, and provision of the passing assist display is restricted. Therefore, the driver can drive the subject vehicle safely while paying attention to the preceding vehicle, instead of giving priority to passing through the intersection without stopping, that is, instead of giving priority to traveling in the target vehicle speed range.

Figure 4C:
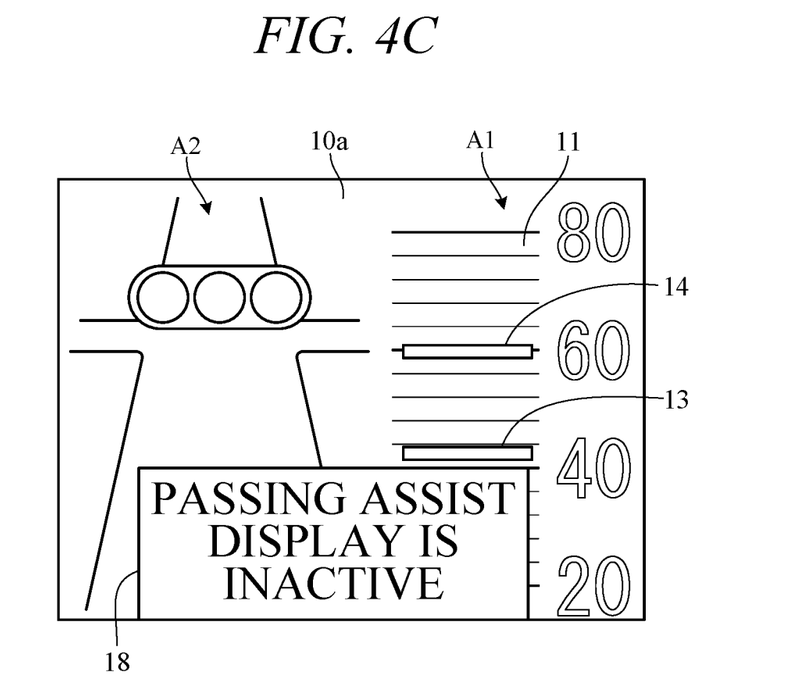
FIG. 4C is a diagram showing another modification of FIG. 4A.

The passing assist display for the intersection may be stopped in a traveling scene in which the warning image 18 is displayed. FIG. 4C illustrates an example thereof. In FIG. 4C, as compared with FIG. 4B, display of the driving behavior image 16 that is a part of the reference image is omitted. That is, the passing assist display becomes inactive. Further, a message such as "Passing assist display is inactive" is displayed on the display screen 10a as the warning image 18. Therefore, the driver drives while focusing ahead, without looking at the display screen 10a. This makes it possible to prevent the subject vehicle from rapidly approaching the preceding vehicle. As described above, the display control unit 24 may control the monitor 10 so as to omit at least one of the target vehicle speed image 12 and the driving behavior image 16 when displaying the warning image 18.

Figure 5:
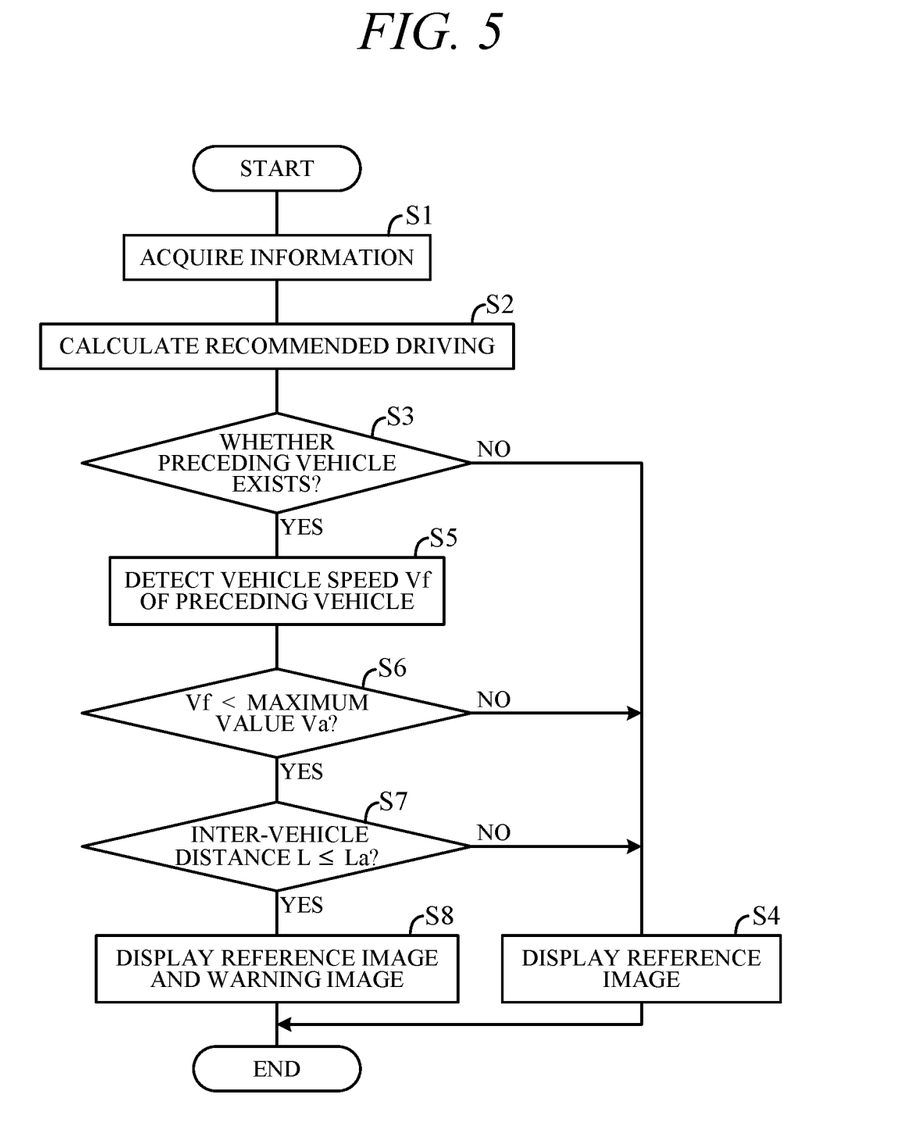
FIG. 5 is a flowchart illustrating an example of processing executed by a controller in FIG. 3.

FIG. 5 is a flowchart showing an example of processing executed by the controller 20 (microprocessor) in FIG. 3. The processing shown in the flowchart starts when, for example, a power key switch is turned on and is repeated at predetermined cycles.

As illustrated in FIG. 5, first, in S1 (S: processing step), the controller acquires the traffic light information received by the communication unit 1 and also acquires the position information of the subject vehicle based on a signal from the positioning sensor 2, the vehicle speed information based on a signal from the vehicle speed sensor 3, and the inter-vehicle distance information based on a signal from the distance sensor 4. The traffic light information includes information regarding a remaining time (green light remaining time, red light remaining time) until the traffic light is switched from green to yellow or from red to green. In S1, the controller further acquires information regarding a legal speed of a road on which the subject vehicle is traveling by referring to the road information stored in advance in the memory. The legal speed information of the road on which the subject vehicle is traveling may also be acquired by recognizing a road sign by using a vehicle-mounted camera.

Next, in S2, the controller calculates a target vehicle speed range having the legal speed as an upper limit as recommended driving for the driver on the basis of the traffic light information, the position information, and the legal speed information acquired in S1. That is, the controller calculates a target vehicle speed range in which the subject vehicle can pass through the intersection where a traffic light is installed without stopping or a target vehicle speed range in a case where the subject vehicle stops in front of the traffic light.

Next, in S3, the controller determines whether or not a preceding vehicle exists within a predetermined distance on the basis of the signal from the distance sensor 4. The controller may determine whether or not the preceding vehicle exists on the basis of an image from a camera mounted on the subject vehicle to capture surroundings of the subject vehicle. The predetermined distance is, for example, a distance from a current location to the traffic light. When it is determined in S3 that no preceding vehicle exists, the processing proceeds to S4.

In S4, the controller outputs a control signal to the monitor 10 such that an image (reference image) of the recommended driving including the target vehicle speed range calculated in S2 is displayed. For example, as illustrated in FIGS. 2A and 2B, the controller outputs a control signal to the monitor 10 such that the target vehicle speed image 12, the subject vehicle speed image 13, and the legal speed image 14 are displayed in association with the scale image 11 in an area A1 and, in addition, the driving behavior image 16 or the deceleration instruction image 17 is displayed on the background image 15.

Meanwhile, when it is determined in S3 that the preceding vehicle exists, the processing proceeds to S5, and the controller detects a vehicle speed Vf of the preceding vehicle on the basis of the vehicle speed information and the inter-vehicle distance information acquired in S1.

Next, in S6, the controller determines whether or not the vehicle speed Vf detected in S5 is smaller than a maximum value Va of the target vehicle speed range calculated in S2. This determination is a determination as to whether or not the subject vehicle traveling according to the recommended driving may approach the preceding vehicle. When it is determined in S6 that the vehicle speed Vf is smaller than the maximum value Va, the processing proceeds to S7. If not, the processing proceeds to S4.

In S7, the controller sets the predetermined value La according to the vehicle speed by using the vehicle speed information acquired in S1 and determines whether or not the inter-vehicle distance L is equal to or smaller than the predetermined value La by using the inter-vehicle distance information. When it is determined in S7 that the inter-vehicle distance L is equal to or smaller than the predetermined value La, the processing proceeds to S8. If not, the processing proceeds to S4.

In S8, the controller outputs a control signal to the monitor 10 such that not only the image (reference image) of the recommended driving including the target vehicle speed range calculated in S2 but also, for example, the warning image 18 illustrated in FIG. 4A are displayed. As illustrated in FIGS. 4B and 4C, the controller may output a control signal to the monitor 10 such that the warning image 18 is displayed while a part or all of the reference image is being hidden. Further, in S8, the speed of the preceding vehicle may be displayed in addition to the display in FIG. 4A, 4B, or 4C.

The operation of the driving assistance apparatus 100 according to the present embodiment is summarized as follows. For example, the reference image in FIG. 2A is displayed on the monitor 10 in a state where the subject vehicle 101 is approaching the intersection where the traffic light 201 is installed and no preceding vehicle exists ahead of the subject vehicle 101 as illustrated in FIG. 1A. Specifically, the driving behavior image 16 indicating that the subject vehicle 101 can pass through the intersection where the traffic light 201 is installed without stopping is displayed together with the target vehicle speed image 12 indicating the target vehicle speed range for the subject vehicle to pass through the intersection without stopping (S4). Therefore, the driver can easily recognize the target vehicle speed for passing through the intersection without stopping and thus can perform a smooth traveling operation of the subject vehicle 101.

On the other hand, as illustrated in FIG. 1B, when the preceding vehicle 102 exists ahead of the subject vehicle 101 by the distance L, different images are displayed on the monitor 10 depending on a magnitude of the maximum value Va of the target vehicle speed indicated by the target vehicle speed image 12, a magnitude of the vehicle speed Vf of the preceding vehicle 102, and the inter-vehicle distance L between the subject vehicle 101 and the preceding vehicle 102. That is, when the vehicle speed Vf of the preceding vehicle 102 is equal to or larger than the maximum value Va of the target vehicle speed, the subject vehicle 101 is not approaching the preceding vehicle 102. In this case, the warning image 18 is not displayed on the monitor 10, and a reference image similar to that when the preceding vehicle 102 does not exist is displayed (S6→S4). Even in a case where Vf<Va and the subject vehicle 101 is approaching the preceding vehicle 102, it is unnecessary to warn the driver of the approach to the preceding vehicle 102 if the inter-vehicle distance L is larger than the predetermined value La, and, also in this case, a reference image similar to that when the preceding vehicle 102 does not exist is displayed (S7→S4). Therefore, the driver can easily recognize the target vehicle speed on the basis of the display image, without display of a part of the reference image being hidden by the warning image 18.

Meanwhile, when the vehicle speed Vf of the preceding vehicle 102 is smaller than the maximum value Va of the target vehicle speed and the inter-vehicle distance L becomes equal to or smaller than the predetermined value La, for example, the warning image 18 illustrated in FIG. 4A is displayed on the monitor 10 (S8). Therefore, the driver can easily recognize that there is a possibility of approaching (rapidly approaching) the preceding vehicle 102 by a predetermined degree or more if the subject vehicle travels at the target vehicle speed in order to pass through the intersection without stopping. Accordingly, the driver drives the subject vehicle with sufficient attention to the inter-vehicle distance from the preceding vehicle 102. This enhances traveling safety when the passing assist display for the intersection is performed.

According to the present embodiment, the following operations and effects are achievable.

(1) A driving assistance apparatus 100 according to the present embodiment includes: an information acquisition unit 21 that acquires traffic light information including switching information of a traffic light and position information on a position of an subject vehicle 101 with respect to the traffic light; a driving derivation unit 22 that derives recommended driving for a driver on the basis of the traffic light information and the position information acquired by the information acquisition unit 21; a monitor 10 that displays information; a display control unit 24 that controls the monitor 10 so as to notify the driver of information on the recommended driving derived by the driving derivation unit 22; and a distance sensor 4 that measures an inter-vehicle distance L between the subject vehicle 101 and a preceding vehicle 102 that travels ahead of the subject vehicle (FIG. 3). The display control unit 24 controls the monitor 10 so as to display a reference image corresponding to the information on the recommended driving when the inter-vehicle distance L measured by the distance sensor 4 is larger than a predetermined value La and to display a warning image 18 as warning information together with the reference image when the inter-vehicle distance L is equal to or small than the predetermined value La (FIG. 5).

With this configuration, the driver can recognize the target vehicle speed at which the subject vehicle can pass through the intersection without stopping and can also easily recognize that the subject vehicle may rapidly approach the preceding vehicle if the subject vehicle travels at the target vehicle speed. As a result, it is possible to provide the driving assistance apparatus 100 considering safety in a case where the preceding vehicle 102 exists.

(2) The information on the recommended driving derived by the driving derivation unit 22 includes information on a recommended vehicle speed (target vehicle speed) of the subject vehicle 101. The driving assistance apparatus 100 further includes a vehicle speed detection unit 23 that detects a vehicle speed Vf of the preceding vehicle 102 based on signal from the sensors 3 and 4 (FIG. 3). When the vehicle speed Vf detected by the vehicle speed detection unit 23 is smaller than the maximum value Va in a range of the target vehicle speed, the display control unit 24 controls the monitor 10 so as to display the warning image 18 (FIG. 5). Therefore, when the subject vehicle 101 may approach the preceding vehicle 102, the warning image 18 is displayed, and warning can be output to the driver at an optimal timing. The display control unit 24 may control the monitor 10 so as to display the warning image 18 when the vehicle speed of the subject vehicle 101 detected by the vehicle speed sensor 3 is faster than the vehicle speed Vf detected by the vehicle speed detection unit 23, instead of Vf<Va. Therefore, when the subject vehicle 101 approaches the preceding vehicle 102, the warning image 18 is displayed.

(3) The target vehicle speed V is a vehicle speed at which the subject vehicle 101 can pass through an intersection where the traffic light is installed without stopping at the intersection. Therefore, it is possible to achieve a smooth traffic flow at the intersection while drawing the driver's attention when the subject vehicle approaches the preceding vehicle.

(4) When the inter-vehicle distance L is equal to or less than the predetermined value La, the display control unit 24 controls the monitor 10 so as to display the warning image 18 superimposed on the reference image (FIG. 4A). Therefore, it is possible to appropriately notify the driver of useful information via a limited display area.

The above embodiment can be modified to various forms. Several modifications will be described below. In the above embodiment, the information acquisition unit 21 acquires the traffic light information including the switching information of the traffic light transmitted from the optical beacon roadside unit 202. However, after the current position of the subject vehicle is specified by the positioning sensor 2, the information acquisition unit may acquire the traffic light information transmitted from the server device that manages the switching of the traffic light corresponding to the current position of the subject vehicle. Although in the above embodiment, the position of the subject vehicle is detected by the positioning sensor 2, the position of the subject vehicle with respect to the traffic light may be detected by using a radar, a LIDAR, or a camera.

In the above embodiment, the driving derivation unit 22 derives the recommended driving for the driver based on the traffic light information and the position information of the subject vehicle acquired by the information acquisition unit 21. Specifically, the range of the vehicle speed to be satisfied by the subject vehicle (target vehicle speed range) and the instruction to perform the deceleration operation (deceleration instruction) are derived as part of the recommended driving. However, other recommended driving such as an instruction of lane change may be derived, and thus the configuration of a derivation unit is not limited to those described above. In the above embodiment, the information on the recommended driving derived by the driving derivation unit 22 is notified to the driver via the monitor 10 (display part). However, the information may be notified to the driver by an audio output in addition to the display.

In the above embodiment, the warning image 18 (a second image) is displayed on the monitor 10 together with the reference image (a first image) on the condition that the vehicle speed Vf of the preceding vehicle is slower than the maximum value Va of the target vehicle speed and the inter-vehicle distance L is equal to or smaller than the predetermined value La. However, the warning image 18 may be displayed after omitting the fact that the vehicle speed Vf of the preceding vehicle is slower than the maximum value Va of the target vehicle speed. That is, as long as controlling the monitor so as to display the first image corresponding to the information on the recommended driving when the inter-vehicle distance measured by the distance sensor 4 (a distance measurement part) is larger than the predetermined value and to display the second image as the warning information together with the first image when the inter-vehicle distance is equal to or smaller than the predetermined value, the configuration of a display control unit may be any configuration.

Although in the above embodiment, the target vehicle speed image 12 and the driving behavior image 16 are included in the reference image, information on remaining time until the traffic light switches from a green as a first aspect to a yellow as a second aspect, and remaining time until the traffic light switched from a red as a first aspect to a green as a second aspect are included in the reference image. The display of the subject vehicle speed image 13 and the legal speed image 14 may be omitted. That is, the configuration of the first image is not limited to the above configuration. In the above embodiment, a predetermined text message is displayed as the warning image 18. However, a figure such as an illustration may be displayed, and the second image is not limited to the above configuration.

In the above embodiment, the configuration of the driving assistance apparatus 100 is described by referring to the case where the subject vehicle passes through the intersection where the traffic light is installed. However, the traffic light may be installed in not only the intersection but also a pedestrian crossing or the like. In this case also, the driving assistance apparatus of the present invention can be applied.

The present invention can also be used as a driving assistance method including measuring an inter-vehicle distance from a subject vehicle to a preceding vehicle traveling ahead of the subject vehicle, acquiring traffic light information including switching information on a traffic light and position information on a position of the subject vehicle with respect to the traffic light, the traffic light informing a driver of stopping or non-stopping at a predetermined position, deriving a recommended driving for the driver based on the traffic light information and the position information, and controlling a display part so as to notify the driver of information on the recommended driving, wherein the controlling includes controlling the display part so as to display a first image corresponding to the information on the recommended driving when the inter-vehicle distance is larger than a predetermined value and to display a second image as warning information together with the first image when the inter-vehicle distance is equal to or smaller than the predetermined value.

The above embodiment can be combined as desired with one or more of the above modifications. The modifications can also be combined with one another.

According to the present invention, it is possible to perform a driving assist considering safety in a case where a preceding vehicle exists.

Above, while the present invention has been described with reference to the preferred embodiments thereof, it will be understood, by those skilled in the art, that various changes and modifications may be made thereto without departing from the scope of the appended claims.

What is claimed is:

1. A driving assistance apparatus comprising:
a display part displaying information;
a distance measurement part measuring an inter-vehicle distance from a subject vehicle to a preceding vehicle traveling ahead of the subject vehicle; and an electronic control unit including a microprocessor and a memory connected to the microprocessor, wherein the microprocessor is configured to perform:

acquiring traffic light information including switching information on a traffic light and position information on a position of the subject vehicle with respect to the traffic light, the traffic light informing a driver of stopping or non-stopping at a predetermined position;

deriving a recommended driving for the driver, based on the traffic light information and the position information; and controlling the display part so as to notify the driver of information on the recommended driving, and the microprocessor is configured to perform the controlling including controlling the display part so as to display a first image corresponding to the information on the recommended driving when the inter-vehicle distance measured by the distance measurement part is larger than a predetermined value and to display a second image as warning information together with the first image when the inter-vehicle distance is equal to or smaller than the predetermined value.

2. The driving assistance apparatus according to claim 1, further comprising a vehicle speed detection part detecting a vehicle speed of the preceding vehicle, wherein the information on the recommended driving includes information on a recommended vehicle speed for the subject vehicle, and the microprocessor is configured to perform the controlling including controlling the display part so as to display the second image when the vehicle speed detected by the vehicle speed detection part is smaller than a maximum value in a range of the recommended vehicle speed.

3. The driving assistance apparatus according to claim 2, wherein the recommended vehicle speed is a vehicle speed capable of traveling without stopping at the predetermined position for the subject vehicle.

4. The driving assistance apparatus according to claim 3, wherein the first image includes a target vehicle speed image indicating the vehicle speed capable of traveling without stopping at the predetermined position, and a driving behavior image indicating a driving behavior traveling without stopping at the predetermined position.

5. The driving assistance apparatus according to claim 4, wherein the microprocessor is configured to perform the controlling including controlling the display part so as not to display at least one of the target vehicle speed image and the driving behavior image when the inter-vehicle distance is equal to or smaller than the predetermined value.

6. The driving assistance apparatus according to claim 1, wherein the microprocessor is configured to perform the controlling including controlling the display part so as to display the second image superimposed on the first image when the inter-vehicle distance is equal to or small than the predetermined value.

7. A driving assistance apparatus comprising:

a display part displaying information;

a distance measurement part measuring an inter-vehicle distance from a subject vehicle to a preceding vehicle traveling ahead of the subject vehicle; and an electronic control unit including a microprocessor and a memory connected to the microprocessor, wherein the microprocessor is configured to function as:

an information acquisition unit that acquires traffic light information including switching information on a traffic light and position information on a position of the subject vehicle with respect to the traffic light, the traffic light informing a driver of stopping or non-stopping at a predetermined position;

a derivation unit that derives a recommended driving for the driver, based on the traffic light information and the position information acquired by the information acquisition unit; and a display control unit that controls the display part so as to notify the driver of information on the recommended driving derived by the derivation unit, and the display control unit controls the display part so as to display a first image corresponding to the information on the recommended driving when the inter-vehicle distance measured by the distance measurement part is larger than a predetermined value and to display a second image as warning information together with the first image when the inter-vehicle distance is equal to or smaller than the predetermined value.

8. The driving assistance apparatus according to claim 7, further comprising a vehicle speed detection part detecting a vehicle speed of the preceding vehicle, wherein the information on the recommended driving derived by the derivation unit includes information on a recommended vehicle speed for the subject vehicle, and the display control unit controls the display part so as to display the second image when the vehicle speed detected by the vehicle speed detection part is smaller than a maximum value in a range of the recommended vehicle speed.

9. The driving assistance apparatus according to claim 8, wherein the recommended vehicle speed is a vehicle speed capable of traveling without stopping at the predetermined position for the subject vehicle.

10. The driving assistance apparatus according to claim 9, wherein the first image includes a target vehicle speed image indicating the vehicle speed capable of traveling without stopping at the predetermined position, and a driving behavior image indicating a driving behavior traveling without stopping at the predetermined position.

11. The driving assistance apparatus according to claim 10, wherein the display control unit controls the display part so as not to display at least one of the target vehicle speed image and the driving behavior image when the inter-vehicle distance is equal to or smaller than the predetermined value.

12. The driving assistance apparatus according to claim 7, wherein the display control unit controls the display part so as to display the second image superimposed on the first image when the inter-vehicle distance is equal to or small than the predetermined value.

13. A driving assistance method comprising:

measuring an inter-vehicle distance from a subject vehicle to a preceding vehicle traveling ahead of the subject vehicle;

acquiring traffic light information including switching information on a traffic light and position information on a position of the subject vehicle with respect to the traffic light, the traffic light informing a driver of stopping or non-stopping at a predetermined position;

deriving a recommended driving for the driver, based on the traffic light information and the position information; and controlling a display part so as to notify the driver of information on the recommended driving, wherein the controlling includes controlling the display part so as to display a first image corresponding to the information on the recommended driving when the inter-vehicle distance is larger than a predetermined value and to display a second image as warning information together with the first image when the inter-vehicle distance is equal to or smaller than the predetermined value.

* * * * *